United States Patent [19]
Seifert

[11] Patent Number: 6,099,028
[45] Date of Patent: *Aug. 8, 2000

[54] GAS BAG MODULE

[75] Inventor: Knut Seifert, Schwäbisch Gmünd/Lindach, Germany

[73] Assignee: TRW Occupant Restraint Systems GmbH & Co. KG, Alfdorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/106,575

[22] Filed: Jun. 29, 1998

[30] Foreign Application Priority Data

Jul. 3, 1997 [DE] Germany ............... 297 11 679 U

[51] Int. Cl.⁷ .................. B60R 21/20; B60R 21/16; B60R 21/28
[52] U.S. Cl. .................. 280/728.3; 280/732; 280/740
[58] Field of Search ................ 280/732, 728.3, 280/730.1, 740, 742

[56] References Cited

U.S. PATENT DOCUMENTS

| | | |
|---|---|---|
| 5,004,266 | 4/1991 | Miller et al. . |
| 5,348,343 | 9/1994 | Hawthorn . |
| 5,364,124 | 11/1994 | Donegan et al. . |
| 5,398,959 | 3/1995 | Avila ........................ 280/728.2 |
| 5,613,698 | 3/1997 | Patercsak et al. ........... 280/732 |
| 5,676,390 | 10/1997 | Olson ....................... 280/728.2 |

FOREIGN PATENT DOCUMENTS

| | | |
|---|---|---|
| 0558271 | 9/1993 | European Pat. Off. . |
| 08268198 | 10/1996 | Japan . |
| 9706984 | 2/1997 | WIPO . |

*Primary Examiner*—Lanna Mai
*Assistant Examiner*—Jeff Restifo
*Attorney, Agent, or Firm*—Tarolli, Sundheim, Covell, Tummino & Szabo L.L.P.

[57] ABSTRACT

A gas bag module includes a gas bag stowed folded in a housing. To provide a gas bag module which permits a controlled emergence of the gas bag on it being activated and, more particularly, permits a reduction in the velocity with which the cover hits an obstacle, said gas bag is surrounded by a sleeve provided with a tear line, said sleeve permitting free deployment of said gas bag in the main direction away from the bottom of said housing up to a fraction of its volume, the sleeve then being tensioned by the force of expansion of said deploying gas bag and allowing further expansion of said gas bag laterally away from said main direction until said sleeve is torn open at said tear line, permitting further expansion of said gas bag also in said main direction.

7 Claims, 1 Drawing Sheet

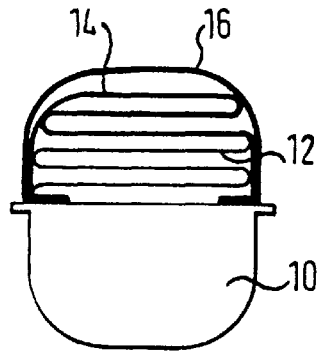
FIG. 1
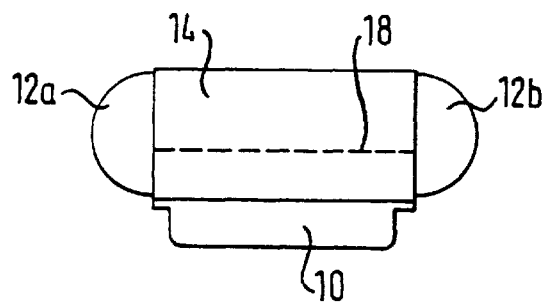
FIG. 2
FIG. 3
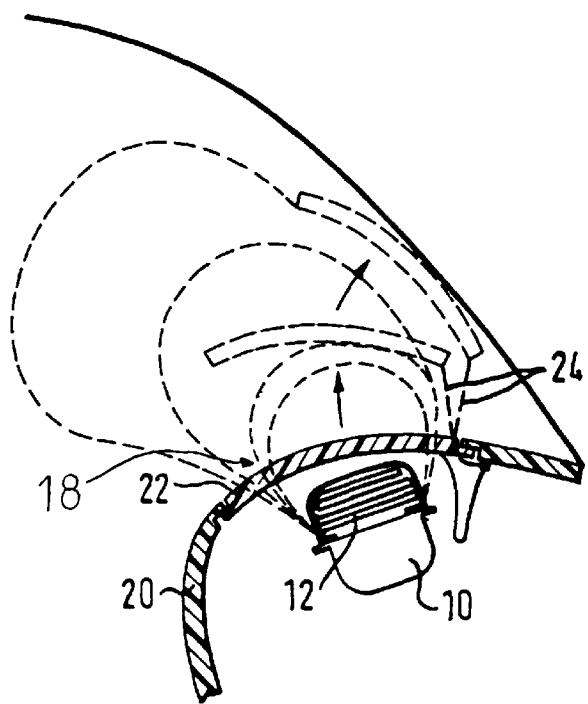

GAS BAG MODULE

FIELD OF THE INVENTION

The invention relates to a gas bag module including a gas bag stowed folded in a housing.

BACKGROUND OF THE INVENTION

Such a gas bag module is normally concealed in the vehicle by a cover. On inflation of the gas bag, the cover is opened by the force of expansion, allowing the gas bag to emerge. In the case of a gas bag restraint system on the front passenger side, arranging the gas bag module under the dashboard has proved to be successful. The cover forms a flap inserted releasably in the dashboard. So that the cover presents no hazard on being released from the dashboard on activation of the gas bag, the cover is connected to the dashboard by a tether or the like. Since the gas bag is deployed between the upper side of the dashboard and the inclined windshield of the vehicle, the cover is hurled upwards against the windshield which may be shattered due to the vehemence with which it is hurled against the windshield by the deploying gas bag.

SUMMARY OF THE INVENTION

The invention provides a gas bag module which permits a controlled emergence of the gas bag on it being activated and, more particularly, permits a reduction in the velocity with which the cover hits an obstacle.

In accordance with the invention the gas bag is surrounded by a sleeve provided with a tear line, this sleeve permitting free deployment of the gas bag in the main direction away from the bottom of the housing up to a fraction of its volume, it then being tensioned by the force of expansion of the gas bag on deployment and allowing further expansion of the gas bag laterally away from the main direction until the sleeve is torn open at the tear line, permitting further expansion of the gas bag also in the main direction. Accordingly, the expansion of the gas bag occurs in three phases: in the first phase the gas bag emerges from the housing until the sleeve is tensioned. In the second phase the expansion of the gas bag occurs laterally with regard to the main direction of expansion away from the bottom of the housing. This second phase lasts until as a result of the further increase in the expansion pressure of the gas bag the sleeve is torn open along the tear line, it then, in the third phase, permitting deployment of the gas bag also in the main direction of deployment. In the first phase the cover is initially forced upwards with full force, but then no further acceleration of the cover occurs in the second and third phase so that the cover hits the windshield of the vehicle at a relatively low velocity.

By means of the sleeve in accordance with the invention, the expansion behaviour of the gas bag can be controlled. More particularly, due to the design of the sleeve, which is a component of the gas bag module, it is possible to adapt to the parameters of the vehicle concerned, it being particularly expedient in this arrangement that this adaptation can be done in the gas bag module itself. To achieve a behaviour of the gas bag on deployment specific to the vehicle concerned, the sleeve surrounding the folded gas bag merely needs to be designed accordingly.

In a particularly expedient configuration of the gas bag module, the gas bag package and the sleeve lying folded thereon are held together by a envelope. This envelope may be a foil which is easy to tear open without influencing the expansion behaviour of the gas bag, or only to a minor degree.

In the preferred embodiment of the invention the sleeve is formed by a strip of textile material which is rectangular when spread out flat, the ends of which are secured to the housing. The sleeve configured in this way acts like a belt which constricts the expanding gas bag, thereby deviating the expansion of the gas bag in the second phase from the main direction towards the sides. Preferably the tear line is arranged non-symmetrically, more particularly, at the side facing away from the windshield of the vehicle in the fitted condition.

BRIEF DESCRIPTION OF THE DRAWINGS

Further features and advantages of the invention read from the following description of a preferred embodiment of the gas bag module with respect to the drawings in which:

FIG. 1 is a schematic cross-section of the gas bag module;

FIG. 2 is a schematic plan view of the gas bag module; and

FIG. 3 is a schematic side view of the gas bag module in the vehicle, illustrating the various phases in deployment of the gas bag.

DESCRIPTION OF THE PREFERRED EMBODIMENT

The gas bag module shown in FIGS. 1 to 3 consists of a trough-shaped housing 10 with an inflator inserted therein and a gas bag 12 stowed folded in the housing, the gas bag protruding beyond the upper edge of the housing 10. The folded gas bag package is surrounded by a sleeve 14 comprising a strip of textile material which is rectangular when spread out flat. The ends of the strip are secured to two opposite edges of the housing 10. The strip of textile material forming the sleeve 14 leaves the sides 12a, 12b of the folded gas bag package uncovered, these protruding beyond the sides of the sleeve 14. The length of the strip of textile material forming the sleeve 14 is larger than the circumference of the part of the gas bag package protruding from the housing 10. As apparent from FIG. 1, the sleeve 14 itself lies folded on the folded gas bag package. The gas bag 12 and the sleeve 14 are surrounded by an envelope 16 consisting of a foil easy to tear open. Finally, as evident from FIG. 2, a tear line 18 extends over the full width of the sleeve 14. This tear line 18 is arranged non-symmetrically as explained below with respect to FIG. 3.

FIG. 3 shows the arrangement of the gas bag module in the vehicle, this being a gas bag module for a gas cushion restraint system on the front passenger side. By ways and means known as such, the gas bag module is arranged under the upper portion of a dashboard 20 of the vehicle. A flap-shaped cover 22 for the gas bag module is releasably inserted in the upper side of the dashboard 20. This cover 22 is secured at its edge adjacent to the windshield of the vehicle to the dashboard 20 by means of a tether 24. As apparent from FIG. 3 the tear line 18 is located on the side of the gas bag module facing away from the windshield. The location of this tear line 18 is of significance for the wanted direction of deployment of the gas bag 12.

To activate the gas bag it is inflated by the inflator arranged in the interior of the housing 10. After the foil 16 has torn open, the sleeve 14 is forced upwards as a result of which the cover 22 is also released from the dashboard 20. FIG. 3 illustrates the various conditions of the sleeve 14 and the gas bag 12 as well as the cover 22 by dotted lines. In a first phase, the sleeve 14 is deployed by the expansion pressure of the gas bag 12 which emerges from the housing 10 in the main direction as indicated by an arrow in FIG. 3. This main direction is oriented perpendicular away from the bottom of the housing 10. Once the sleeve 14 is tensioned the gas bag 12 is initially unable to spread out further in this direction. Instead, the expansion of the gas bag continues at the sides 12a, 12b. With a further increase in the expansion pressure of the gas bag the sleeve 14 tears at the tear line 18. In the subsequent third phase the gas bag 12 is again able to spread predominantly in the main direction. During the first phase the cover 22 releases from the dashboard 20 and is accelerated against the windshield up to the point in time at which the sleeve 14 is tensioned. In the subsequent second phase no further acceleration of the cover 22 occurs in the direction of the windshield. It is not until the third phase when the cover 22 is already in contact with the inner side of the windshield or shortly before attaining this final position that a further pressure materializes against the cover 22 and also against the windshield due to the gas bag deploying to full size.

It will thus be appreciated that due to the sleeve 14 for one thing the expansion behaviour of the gas bag can be decisively influenced, whilst the configuration of the sleeve 14 and, more particularly, the arrangement of the tear line 18 offers a wealth of means of influencing the situation; for another, the force and energy with which the cover 22 is hurled against the windshield is considerably reduced.

What is claimed is:

1. A gas bag module comprising:

a housing with a bottom;

an inflatable gas bag stored folded in said housing, said gas bag in its folded condition defining lateral limits; and a sleeve surrounding said gas bag when said gas bag is stored folded in said housing, said sleeve having a first untensioned condition permitting deployment of said gas bag without resistance in a main direction away from said bottom of said housing and a second tensioned condition in which said sleeve is tensioned by a force applied to said sleeve by deployment of said gas bag in said main direction;

said sleeve when in said second tensioned condition resisting deployment of said gas bag in said main direction and defining openings through which said gas bag inflates laterally of said main direction beyond said lateral limits; and said sleeve having a tear line and a third open condition in which said sleeve is torn open at said tear line by said gas bag and enabling further deployment of said gas bag in said main direction.

2. A gas bag module as defined in claim 1 further including an envelope at least partially encircling said sleeve and said gas bag and holding said sleeve and gas bag together.

3. A gas bag module as defined in claim 2 wherein said sleeve is formed by a strip of textile material which is rectangular when spread out flat, the ends of which are secured to said housing.

4. A gas bag module as defined in claim 3 wherein said tear line is non-symmetrical.

5. A gas bag module as defined in claim 1 wherein said gas bag, when inflated through said openings, inflates beyond said housing in opposite directions.

6. A gas bag module as defined in claim 1 wherein said sleeve is folded on said gas bag when said gas bag is stored folded in said housing.

7. A gas bag module as defined in claim 1 wherein said gas bag extends laterally beyond said sleeve when said gas bag is stored folded in said housing.

* * * * *